United States Patent [19]

Strickman

[15] 3,657,125
[45] Apr. 18, 1972

[54] COLLECTION OF OILS
[72] Inventor: Robert L. Strickman, River Vale, N.J.
[73] Assignee: Strickman Industries, Inc., Orangeburg, N.Y.
[22] Filed: July 15, 1970
[21] Appl. No.: 55,243

Related U.S. Application Data

[63] Continuation-in-part of Ser. No. 868,916, Oct. 23, 1969.

[52] U.S. Cl. ......................................210/40, 210/DIG. 21
[51] Int. Cl. .............................................................C02b 9/02
[58] Field of Search ....................................210/40, DIG. 21

[56] References Cited

UNITED STATES PATENTS 3,334,042   8/1967   Teitsma ..........................210/DIG. 21
3,352,778   11/1967  Brink et al. ..............................210/23
3,494,862   2/1970   Horowitz ...................................210/40

OTHER PUBLICATIONS

Chemical and Engineering News, July 1, 1968, Pages 46–47.

Primary Examiner—Reuben Friedman
Assistant Examiner—Thomas G. Wyse
Attorney—Hane, Baxley & Spiecens

[57] ABSTRACT

Oils, particularly petroleum oils may be removed from water, from beaches and from wildlife, by contacting the oils with a collector comprising granular polyurethane particles substantially devoid of cellular structure. Preferably the collector particles are of a jagged, spiny, cragged nature. When applied to an oil contaminant, the collector particles agglomerate the oil into a gel which can be skimmed or otherwise removed easily.

1 Claims, No Drawings

COLLECTION OF OILS

CROSS REFERENCE TO RELATED APPLICATION

This is a continuation-in-part application based on U.S. Pat. application 868,916 filed Oct. 23, 1969.

BACKGROUND OF INVENTION

With ever-increasing sizes of modern tankers and facilities for cleaning and servicing them, there is a stepped-up risk of pollution resulting from leakage and/or spillage. A case in point was the Torrey Canyon disaster of 1967 wherein some of England's most beautiful beaches were subjected to catastrophic pollution by oil slicks.

In offshore drilling for petroleum there is an ever-present danger that rock fissures, faults or movements of geological formations may release massive doses of polluting petroleum oils. The beaches of Santa Barbara, California, were polluted by petroleum oils released via fissures which developed during offshore drilling. Even as late as 1969, at Santa Barbara, straw had to be used to mop up the oil slicks.

Detergents or dispersants such as that marketed by Imperial Chemical Industries, Ltd. under the trademark "Dispersol", serve to split up such oil slicks but do not remove them.

A discussion of problems in dealing with oil pollution on sea and land was presented by J. W. Smith (of Warren Spring Laboratory, Stevenage, Herts, England) in Vol. 54 No. 539 of the Journal of the Institute of Petroleum (Nov. 1968) wherein a number of solutions to these problems were presented. One proposed solution was to absorb oil contaminants on fragments of polyethylene or polyurethane foam. These very light sponge-type hydrophobic materials float and are wetted readily by oil. But although when spread over floating oil they rapidly absorb the oil, the oil still floats. Smith also suggested that it might be possible to spray something on the oil which would cause it to gel or coagulate and so simplify collection; however no means or materials were suggested for effecting such gelation.

SUMMARY

Accordingly, it is an object of the present invention to provide a process for removing pollutant oils, particularly petroleum oils, from the sea or from waterways or from beaches or other occurrences by effecting gelation of the oils.

It is still another object of the present invention to provide a process which accomplishes oil-water separation, not as a liquid-liquid separation, but as a liquid-solid separation; whereby skimming, screening or other known techniques of liquid-solid separation may be used to remove the gelled oil.

It is still another object of the present invention to provide a process for removing an oil slick from a beach, and in which the collector material may be applicable to the beach, either before or after contamination by the oil slick.

It is still another object of the present invention to provide a process for reclaiming oil from sands, for example in in the vicinity of oil wells.

It is still another object of the present invention to provide a process for removing oils from food products.

It is still another object of the present invention to provide a suitable collector material for use in the foregoing processes.

It is still another object of the present invention to provide a suitable collector material which reduces the area covered by an oil slick and prevents leakage of the slick through breaks in a confining boom.

It is still another object of the present invention to provide a material which can gel whole tank fulls of oil to prevent the oil's dissemination into a slick.

It is still another object of the present invention to provide a collector material which operates on contact with an oil and which can be handled safely and conveniently.

It is still another object of the present invention to provide a collector material which may be used safely in contact with wildlife such as fish, birds, shellfish and mammals to remove oil contaminations therefrom.

It is still another object of the present invention to provide a collector material which can be used, in conjunction with one or more other filtering materials, to serve as a final filtering medium.

It is still another object of the present invention to provide a collector material which can be used in filtering systems, such as those used in cleaning ship's bilges, for separation of oils from detergent solutions or the like.

It is still another object of the present invention to provide a collector material which may be reused and from which the gelled oils can be removed by simple mechanical pressing.

It is still another object of the present invention to provide a process for increasing absorptiveness of polyurethane foams by contacting them with water.

It is still another object of the present invention to provide a process for preparing the collector material.

The foregoing and other objects will be seen from the detailed description of the invention which follows.

The collector material of the present invention comprises a particulate polyurethane which is substantially devoid of cellular structure and, in a preferred embodiment, is rigid and composed of granules which are of a jagged, spiny, cragged nature. The preferred polyurethanes, as contemplated by the invention are characterized by having sufficient rigidity at ambient temperatures so that they may be granulated in conventional equipment.

The particulate collector material of the invention is desirably of a particle size which is preponderantly below about 1,500 microns and preferably between about 50 to 750 microns.

The polyurethanes which comprise the collector material of the invention are those conventionally obtained by the reaction of polyisocyanates with polyols. The polyols employed as starting materials are preferably predominantly polymeric. The rigidity of the polyurethanes, as well recognized by the polymer chemist, depends upon the existence of crosslinks between the molecules and crosslinking is obtained by employing starting materials having a reaction functionality greater than two. Most commonly, this higher functionality is found in the polyol component, but more recently polyisocyanates have been commercially available having the functionality of greater than two.

Practically any polyol which, when reacted with a polyisocyanate, produces a polyurethane and preferably a rigid polyurethane, may be employed. Among the preferred polyols are the polyether polyols, and especially the reaction products of propylene oxide with low-molecular-weight compounds having two or more hydroxyl groups, such as ethylene glycol, propylene glycol, butanediol, diethylene glycol, dipropylene glycol, triethylene glycol, polyethylene glycol, glycerol, hexanetriol, trimethylolpropane, pentaerythritol, methylglycoside, sorbitol, mannital, glucose, sucrose, etc.

Additional polyols which may be employed with a polyisocyanate to produce the polyurethanes are: polyethylene glycol having molecular weights of 400 and 3,000, tripropylene glycol, 1,4-butanediol, thiodiglycol, hexanediol, neopentyl glycol, glycerol, trimethylolethane, trimethylolphenol, starch, cellulose, polycaprolactone, castor oil, glycerine ethylene oxide adducts, ethylene oxide and mixed ethylene oxide-propylene oxide adducts of the polyols cited, mixed ethylene glycol-propylene glycol adipate resin (molecular weight 1,900 ), polyethylene adipate, etc.

Instead of polyether polyols, there may be employed polyhydroxyl-terminated polyesters, preferably those derived at least in part from triols or higher polyols. The polyester polyols are usually less advantageous than the polyether polyols because they are generally more expensive and more viscous. Among the acids that may be used to make up the preferred polyesters are any of the polycarboxylic acids such as malonic, succinic, adipic, maleic, phthalic, isophthalic, fumaric, oxalic, sebacic, dimerized lineleic or chlorendic together with any of the polyols described above.

Polyols are usually referred to in terms of their hydroxyl number. Polyols having a high hydroxyl number (above 300 ) are preferred when a rigid polyurethane is desired, particularly polyols other than simple, non-polymeric polyols. Hydroxyl numbers which are between about 300 and 800 are most desirable. At the higher hydroxyl numbers, a more friable, but also a less dimensionally stable expanded polyurethane results.

Any polyisocyanate which will give a polymer with a suitable polyol may be employed, but a polyisocyanate which is a liquid at the temperature of reaction, i.e., at between about 15° and 90° C. and particularly between about 15° and 50° C. is preferred. Particularly useful is the widely used tolylene diisocyanate (TDI) sold commercially as the 80:20 or 65:35 mixture of 2,4,:2,6 isomers. Also suitable are p,p'-diphenyl methane diisocyanate (MDI) and its crude grade (PPI) and polymethylene polyphenyl isocyanate (a mixture sold under the tradename PAPI). Other polyisocyanates which can be employed are: dianisidine diisocyanate, xylylene diisocyanate, diphenyl sulfone diisocyanate, 4-chloro- 1,3-phenylene-diisocyanate; 4-isopropyl- 1,3-phenylene diisocyanate; 2,4-diisocyanatodiphenylether; 3,3-dimethyl- 4,4-diisocyanatodiphenylmethane; mesitylene diisocyanate; 4,4-diisocyanatodibenzyl; 1,5-naphthalene diisocyanate; 3,3'-bitolylene- 4,4'-diisocyanate; triphenylmethane triisocyanate, tritolylmethane triisocyanate, tetramethylene diisocyanate; hexamethylene diisocyanate; the diisocyanate derived from dimer acids; decamethylene diisocyanate, the reaction product of toluene diisocyanate with trimethylolpropane at an NCO/OH ratio of 2:1 (Mondur CB), etc.

The polyisocyanate is usually employed in slight stoichiometric excess over the polyol so as to provide excess isocyanate linkages for crosslinking with formation of biuret and allophanate linkages. Typical isocyanate to hydroxyl group ratios are from 1.03 to 1.25:1. On a weight basis this represents a range of approximately 40 to 150 parts of polyisocyanate per 100 parts of polyol. Excess isocyanate will also react with any water, if present, to generate carbon dioxide which acts as a blowing agent to aid in forming a foam. The use of excess isocyanate as well as the use of polyisocyanates having functionalities greater than two tend to provide foams which are more brittle.

The use of catalysts to assist in the formation of the polyurethanes is conventional and any of those known in the art may be employed in the present invention. An especially effective catalyst is N,N,N', N'-tetrakis (2-hydroxypropyl) ethylenediamine (sold under the tradename Quadrol), because it is both catalytic, by virtue of its amino groups, and reactive with the polyisocyanate, by virtue of its hydroxyl groups. It acts, therefore, as a polyol, a catalyst and a crosslinking agent and it becomes chemically incorporated into the polyurethane.

Other conventional catalysts that may be employed in polyurethane technology are N-methylmorpholine, N-ethylmorpholine, trimethylamine, triethylamine, tributylamine and other trialkylamines, triethylenediamines, tetramethylbutylenediamine, 3-diethylaminopropionamide, heat activated catalysts such as triethylamine citrate, 3-morpholinopropionamide, 2-diethylaminoacetamide, the esterification product of 1 mole of adipic acid and 2 moles of diethylethanolamine, 3-diethylaminopropionamide, diethylethanolamine, triethylenediamine, N,N'dimethylpiperazine, N,N-dimethylhexahydroaniline, tribenzylamine and sodium phenolate; metal compounds such as dibutyltin dilaurate, stannous chloride, dioctyltin oxide, stannous octoate, dibutyltin dioctoate, dibutyltin diacetate, chlorides of antimony, chlorides of titanium, chlorides of lead; especially the tin compounds herein set forth. If a conventional catalyst is employed, amounts of between 0.02 and 2.0 parts per 100 parts by weight of polyol are desirable, but if Quadrol or any other catalyst which becomes chemically incorporated into the polymer is employed, much larger amounts, such as up to 20 parts, are usually desirable.

The polyurethane is produced first in an intermediate form as a foam, preferably a rigid foam. This foam may be produced in accordance with the practices well known in the foam art such as by the prepolymer method, the semi-prepolymer (or quasi-prepolymer) method, or the so-called one-shot method. These are all well known methods of foam preparation. The semi-prepolymer method is generally considered to be more reliable, but the one-shot method is clearly the more economical. Both of these latter two methods are especially suitable for manufacture of the foam from which absorbent material of the present invention may be produced.

The preparation of a foamed polyurethane requires preparation of polyurethane in the presence of some means of blowing or expanding the polymer material. One well known foam-producing technique uses water which reacts with excess isocyanate to produce carbon dioxide which then acts as the blowing or expanding agent. One may also use nitrogen, carbon dioxide or other inert gases to provide the expansion. Whipping of air or other inert gas into the polymerizing mass may be used.

In accordance with a preferred method of the invention, it is desirable to employ a halogenated hydrocarbon, such as the fluorinated hydrocarbons of the type sold under the trademarks "Freon" and "Genetron". Among the fluorinated hydrocarbons which may be employed are those which are sufficiently volatile to evaporate at the temperature of foam productions. Desirably, the material shall have a boiling point slightly higher than ambient temperature. Among the satisfactory fluorinated hydrocarbons which may be employed are trichlorofluoromethane, dichlorodifluoromethane, dichlorotetrafluoroethane, dichloromonofluoromethane, monochlorodifluoromethane, trichlorotrifluoroethane, and monochlorotrifluoromethane. Desirably, about 5 to 35 parts of blowing agent are employed per 100 parts of polyol.

Conventional surface active agents may be employed, especially those known to polyurethane technologists, to help in nucleation and the formation of a more or less uniform, fine cell structure. These include the silicones and particularly those known in the trade as L-520,L-530,L-5310, and L-5320 (Union Carbide) and DC-199, DC-113, DC-201 and DC-202 (Dow Corning), XF-1066 (General Electric) believed to be block copolymers of silicone and alkylene oxides. These are usually employed in amounts of up to 1 part per 100 polyol.

The rigid polyurethane foam is cured after formation by being permitted to stand at ambient temperature for at least about a day. Alternatively, the curing may be accelerated by the use of elevated temperatures, which generally should not exceed 130° C. During the curing treatment the foam loses its tackiness and develops its maximum rigidity.

After the formation of the polyurethane foam having preferably a bulk density of between 0.5 to 4.0 lbs./cu.ft., the foam is subjected to a granulation operation to produce granular particles substantially devoid of cells and preferably having highly irregular physical shapes in the form of jagged, spiny, cragged particles. The granulation is normally conducted by grinding the foam. One preferred method of grinding is the use of a Pallmann grinder to reduce the foam to the desired particle sizes.

After the grinding operation, it is desirable to subject the rigid polyurethane particles to the action of water or steam. This is an important step of a preferred embodiment of the process for preparing the collector material. The temperature of the water of steam can range from room temperature up to about 140° C. Above 140° C. there is danger of decomposing the product. During this treatment, considerable swelling of the granules takes place and it has been found that polyurethanes thus treated are more effective oil collectors than granules not subjected thereto.

An optional inorganic material which may be employed in preparation of the polyurethane intermediate foam are the lower alkyl silicates, such as those alkyl silicates containing up to four carbon atoms in the alkyl group. Ethyl silicate is preferred. It is desirable to employ up to about 5 parts of alkyl silicate per 100 parts of polyol.

In carrying out the process of removing oil from water in accordance with a process of the present invention, the mixture of oil and water may be slurried with the collector material or passed through one or more columns packed with the collector material. In those instances where the oil is spread over a large area of water, as may result from sinking of an oil tanker or an accident in offshore drilling, the collector material may be directly sprayed or poured on the oil surface, or permeable bags containing the collector material may be dumped on the oil. The collector material containing the oil can then be removed readily by skimming or screening it from the surface of the water.

In carrying out the process of removing oil from sand in accordance with another process of the present invention, the collector material is contacted with the sand (with or without water). Separation is effected by floatation.

In carrying out the process of removing oil from a food product in accordance with another process of the present invention, the collector material may be slurried with the food product or the food product may be passed through one or more columns packed with the collector material.

The following are examples illustrating the preparation of collectors for oils in accordance with this invention, and the use of the collector material in separating oil from water. The parts are by weight, unless otherwise specified.

EXAMPLE 1

Step A

A polyurethane foam was first manufactured from the following materials:
- 100 parts of polyol (formed by the condensation of sorbitol with propylene oxide, the condensation product having a hydroxyl number of about 490, available as G 2410 from Atlas Powder Co., Chemicals Division, Wilmington, Delaware);
- 76 parts of tolylene diisocyanate (a commercially available 80:20 mixture of the 2,4 and 2,6 isomers);
- 25 parts of trichlorofluoromethane; and
- 0.5 to 1.5 parts of triethylenediamine, as catalyst.

The catalyst was dissolved in the halogenated hydrocarbon, which was added to a mixture of the polyol and isocyanate and the mixture was suitably agitated. Foaming began.

Upon completion of the foaming reaction, and when the mass became rigid, it was granulated to form irregularly shaped, spiny, jagged particles. The granular mass, having a mesh size in the range of 50–300 (U.S. standard mesh size), constituted material for preparation of the collector material.

Step B

The granular mass produced in Step A was contacted physically with an excess of Gulf Coast crude petroleum oil and water. The granular mass collected eleven times its own weight of the petroleum oil to produce a curd-like agglomerated gel that was separated from the water by skimming and filtering through a wide mesh leaving water essentially devoid of oil. A mixture of Gulf Coast crude oil and water was passed through a permeable cartridge containing the granular mass and the granular mass collected 11 times its own weight of the petroleum oil. Similar results were obtained using animal and vegetable oils as well as refined Gulf Coast petroleum products.

EXAMPLE 2

Step A

The granular mass produced in Example 1 was washed with hot water at a temperature from 80° to 95° C. for about 3–5 minutes and filtered. The still moist granules were dried at atmospheric pressure at a temperature of 60°–105° C.

Step B

The granular mass produced in Step A was contacted physically with an excess of Gulf Coast crude petroleum oil and water. The granular mass collected 13 times its own weight of the petroleum oil to produce a curd-like agglomerated gel that was separated from the water by skimming and filtering through a wide mesh leaving water essentially devoid of oil. A mixture of Gulf Coast crude oil and water was passed through a permeable cartridge containing the granular mass and the granular mass collected 13 times its own weight of the petroleum oil. Similar results were obtained using animal and vegetable oils as well as refined Gulf CoaSt petroleum products.

Step C

The agglomerated gel produced in Step B was squeezed in a press and 71 percent of the oil was removed thereby. Substantially all of the remaining oil was recovered by washing the agglomerated gel with light naphtha. The collector was suitable for reuse both before and after the washing with naphtha.

EXAMPLE 3

Step A 30 parts of the reaction product of pentaerythritol with propylene oxide and having a hydroxyl number of 560 was mixed with 100 parts of tolylene diisocyanate (80/20 mixture of the 2,4 and 2,6 isomers). The temperature was not allowed to exceed 90° C. and the reaction was carried out under dry nitrogen gas. The product was allowed to cool and was stored in the absence of moisture.

Step B

A mixture was made of 75parts of the polyol described in Step A, 10 parts of N,N,N',N'-tetra-kis (hydroxypropyl) ethylene diamine, 3 parts of a 30 percent aqueous solution of sodium tungstate, 2 parts of ethyl silicate, 0.3 part of a 30 percent aqueous solution of triethylene diamine, 15 parts of trifluorochloromethane, and 0.5 part of a urethane-grade silicone surface active agent (L–520 of Union carbide).

Step C

Approximately equal weights of the products from Step A and Step B were mixed thoroughly and poured into a mold. The resulting foam was a white, fine-celled material which was allowed to cure for a day at room temperature. The resulting foam was granulated in a Pallmann mill, and the resulting particles treated with water for about 15 minutes at about 100° C. followed by about a half hour at 80° –100° C. The white granules were then dried in an oven at 105° C. The fraction smaller than 840 microns particle size and larger than 177 microns particle size was collected. The product consisted of particles with a spiny, cragged, irregular shape devoid of cellular structure.

Step D

The granular mass produced in Step C agglomerated 15 times its own weight of Gulf Coast crude oil and about 70 percent thereof was removed by pressing.

EXAMPLE 4

Example 3 was repeated, employing instead of tolylene diisocyanate an equivalent weight of methylene diphenyl diisocyanate. The result was a collector material having equivalent properties to those of the product of Example 3. The granular mass agglomerated 13 times its own weight of Gulf Coast crude oil.

EXAMPLE 5

Example 3 was repeated, but employing an equivalent amount of a mixture of glycerol and tetrol instead of sorbitol. The resulting collector material was similar in its properties to the product of Example 3. The granular mass agglomerated 12 times its own weight of Gulf Coast crude oil.

I claim:

1. A method for removing oil from a mixture of oil and water; the method comprising the steps of:
   contacting the mixture with a collector comprising granules of rigid polyurethane having jagged, spiny, cragged forms, said granules being substantially devoid of cellular structure and having a particle size between 50 and 750 microns; removing mechanically the collector containing the oil from the water.

* * * * *